large and for this reason a voltage is required for
United States Patent Office 3,788,964
Patented Jan. 29, 1974

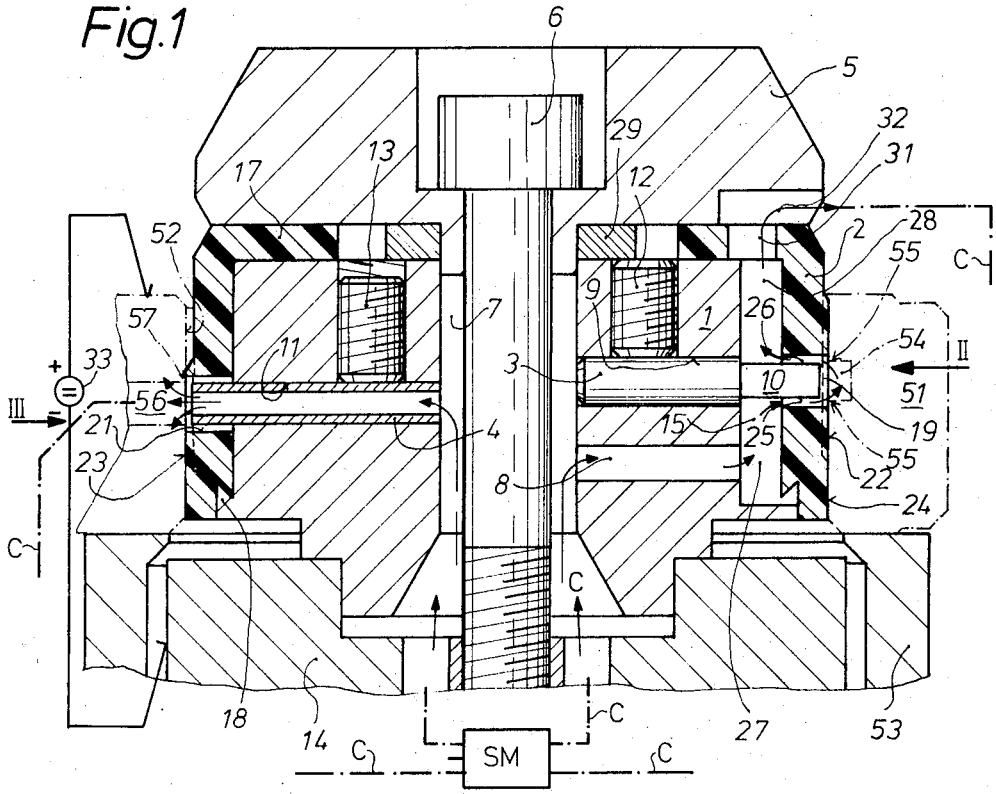

3,788,964
ARRANGEMENT FOR ELECTRO-CHEMICAL TREATMENT OF AN ELECTRICALLY CONDUCTIVE WORKPIECE
Hanns Kurz, Stuttgart, and Siegfried Linder, Ditzingen, Germany, assignors to Robert Bosch G.m.b.H., Stuttgart, Germany
Filed Apr. 26, 1972, Ser. No. 247,620
Claims priority, application Germany, Apr. 29, 1971,
P 21 21 110.9
Int. Cl. B01k 3/04; B23p 1/02, 1/12
U.S. Cl. 204—224 M          8 Claims

ABSTRACT OF THE DISCLOSURE

An electrically insulating sleeve is dimensioned so that it can be accommodated in a bore of an electrically conductive workpiece with the latter having one or more recesses extending from the surface bounding the bore. The sleeve engages the bore surface tightly in the region of the open end of the bore and also about the recess or recesses. The sleeve has an aperture associated and adapted to be placed in registry with each recess, and an electrically conductive working electrode is to be at least in part accommodated in this sleeve. The electrode has a passage for each of the apertures, being longitudinally aligned with the same and accommodating an electrically conductive insert slidable between a retracted position and a plurality of advanced positions in each of which the insert extends to different depths into the aperture. A source of DC current is connected with its negative pole with the working electrode and with its positive pole with the workpiece and a supply arrangement circulates a flow of liquid electrolyte in a path which includes the passage or passages and insert.

BACKGROUND OF THE INVENTION

The present invention relates generally to the electrochemical treatment of electrically conductive workpieces, and more particularly to an arrangement for carrying out such treatment.

It is already known to electro-chemically treat electrically conductive workpieces, if such workpieces have an opening the inner circumferential wall of which is provided with one or more recesses or apertures. Electrochemical treatment is particularly suitable for subjecting the surface of the bore or opening and/or of the recess or aperture to surface treatment, including material removal and more particularly for de-burring purposes. Of course, it should be understood that the cross-sectional configuration of the bores or apertures or recesses is immaterial in this context, that is such cross-sectional configuration could be circular or non-circular, for instance, polygonal.

The electro-chemical treatment of electrically conductive metallic workpieces is already well enough known so that it is not believed necessary to discuss it in detail. Recapitulating briefly, it is pointed out that the removal of metallic material from the workpiece is effected in that between the workpiece and an arrangement having an appropriately configurated working electrode there is established a flow of electrical current at high strength, and in the space between juxtaposed faces of the workpiece and the working electrode—the so-called working gap—there is present an electrolyte which is usually maintained in circulation. The workpiece is connected to the positive pole and the working electrode to the negative pole, of a source of direct current, so that the workpiece constitutes the anode and the working electrode the cathode.

Aside from the general theory of electro-chemical treating of electrically conductive workpieces, the prior art also already knows the de-burring in this manner. Arrangements are known for this purpose which, generally speaking have a metallic conductor surrounded by a layer of electrically insulating material. The layer is interrupted in the region of the working zone, in correspondence with the contours which are to be de-burred so that the flow of electrical current can take place only at the non-insulated portions of the conductor, where the electrically insulating layer is interrupted. When recesses or small bores are to be de-burred, then devices are utilized having a solid locally electrically insulated working electrode to which electrolyte is exteriorly supplied; if the bores or recesses are larger, then it is known to use hollow working electrodes into which the electrolyte is interiorly supplied. The latter is for instance disclosed in Austrian Pat. 209,131. The device disclosed in this prior-art patent is intended to de-burr (and the word here is also used to refer to what amounts to a chamfering operation) the edge formed by the junction of a surface with a blind hole. The disclosed device essentially utilizes a sleeve of electrically insulating material, and the sleeve being closed at both ends and having two spaced openings for the inlet and the outlet of a liquid electrolyte. A working electrode is accommodated in the sleeve, defining a gap therewith. The outlet opening of the sleeve is juxtaposed with the portion of the workpiece which is to be treated so that electrolyte which flows out of the outlet opening contacts predominantly the edge where material is to be removed, that is which is to be rounded or chamfered, or from which is to be de-burred. The working electrode is connected as the cathode and the workpiece is connected as the anode, so that the minus potential is supplied to the electrolyte within the sleeve via the working electrode.

The device just discussed as well as others known from the prior art, are generally suitable for the intended purposes. However, they must be concentrically inserted into the bore of the workpiece in which they are to be accommodated during the treating operation, and of course subsequently to this treating operation, they must again be removed. Particularly the insertion is difficult if the arrangement is to be utilized in an automatic manner, that is if the insertion is to be effected by automatic equipment rather than manually by an operator. The reason for this is that the requirement for concentric positioning cannot always be met, and if the arrangement is rigidly mounted, it is therefore easy for the arrangement to become damaged or at the very least to be subject to substantial wear with a rapid resultant inoperability. Thus, advances are desirable, but not known from the art, which make it possible to utilize arrangements for the electrochemical treatment of electrically conductive workpieces in a fully or semi-automatic manner.

Moreover, it has been observed that quite frequently the prior-art arrangement will cause a blackening or greying of the workpiece surface in the immediate vicinity of the work area, because the electrolyte is of course not confined to contact with the work area itself but can move slightly beyond the work area. In the region of the work area there is also a certain amount of material removal which is undesired, that is a certain scattering effect is obtained in the material-removal process, extending beyond the actual working area. Also, the distance between the working electrode and the workpiece is relatively large and for this reason a voltage is required for the operation of the arrangement which is higher than would otherwise be needed.

SUMMARY OF THE INVENTION

It is, accordingly, a general object of the present invention to provide an improved arrangement of the type here under discussion which avoids the disadvantages of the prior art and provides the desired advantages.

More particularly, it is an object of the present invention to provide such an arrangement for the electro-chemical treatment of an electrically conductive workpiece, which arrangement permits the removal of material from a precisely defined and delimited area of the workpiece without any scattering effect.

A further object of the invention is to provide such an arrangement which is relatively simple in its construction and operation.

With these objects in view and others which will if desired. There is further provided a guide member 5 become apparent hereafter, one feature of the invention resides in an arrangement for the electro-chemical treatment of an electrically conductive workpiece provided with an opening having at least one open end and an inner circumferential boundary surface of which has at least one recess formed therein. Briefly stated the novel arrangement comprises electrically insulating sleeve means having outer dimensions so selected as to be accommodatable in the opening in tight engagement with the boundary surface at least in the region of the open end and the recess circumferentially of both. Aperture means is provided in the sleeve means and adapted to be placed into registry with the recess. Electrically conductive working electrode means is at least in part accommodated in the sleeve means. Passage means is provided in the working electrode means in longitudinal registry with the aperture means. Electrically conductive insert means is received and slidable in the passage means between a retracted position and a plurality of advanced positions in each of which latter it extends to different depths into the aperture means. A source of DC current has a negative pole connected with the working electrode means and a positive pole which is adapted to be connected with the workpiece. Finally, there is provided supply means for circulating a flow of liquid electrolyte in a path which includes the passage means and the insert means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 1 is a sectional view illustrating an embodiment of the invention;

FIG. 2 is an elevational view of the embodiment of FIG. 1, as seen in the direction of the arrow in that figure

DESCRIPTION OF THE PREFERRED EMBODIMENTS

Figure 3:
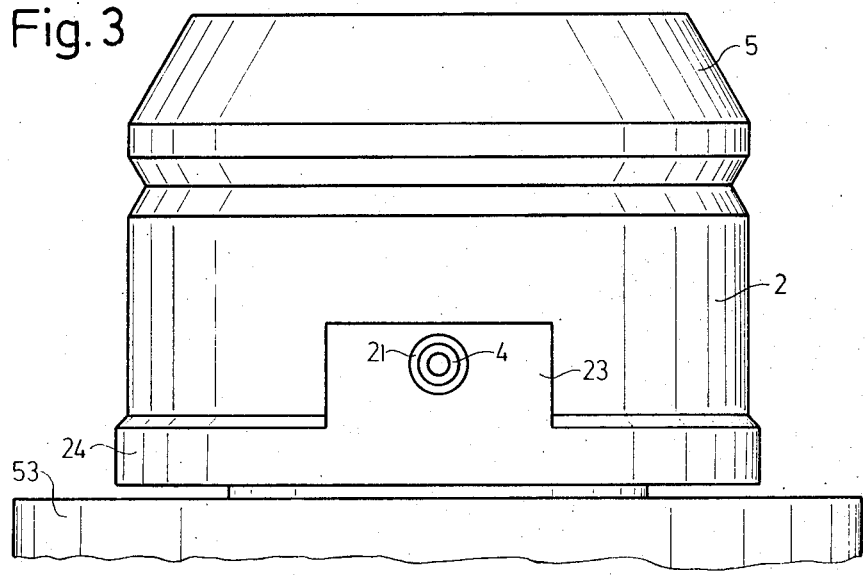
FIG. 3 is a view of FIG. 1 as seen in the direction indicated by the arrow III.

The exemplary arrangement which has been illustrated by way of example in FIGS. 1 and 2 utilizes a working electrode 1 which is in part surrounded by a sleeve 2 of electrically insulating material. The working electrode 1 is, of course, of electrically conductive material. It, that is the electrode 1, has a pair of inserts 3 and 4 which for explanatory purposes have been illustrated as being different in type, but which could evidently be identical if desired. There is further provided a guide member 5 and a cylindrical retaining screw 6, all of which will be fully discussed.

A workpiece to be electro-chemically treated is shown in phantom lines and identified with reference numeral 51. It has a bore or opening bounded by an inner circumferential boundary surface 52 and is supported by a workpiece support 53. Of course, the particular configuration of the workpiece 51 and the cross-sectional configuration of the bore bounded by the surface 52 are of no consequence. It must only be remembered that the workpiece 51 must be electrically conductive. By way of example it has been illustrated that the workpiece 51 is provided in the boundary surface 52 (at the right-hand side of FIG. 1) with a recess 54 of quadratic or rectangular contour which of course also could be of a different geometric configuration and whose edges 55 are to be de-burred or to have material removed for chamfering or rounding. By way of example there has been further illustrated at the left-hand side of FIG. 1, an additional recess or cutout 56 provided in the surface 52 having an edge 57 which is similarly to be rounded or de-burred.

As is most clearly evident from FIG. 1, the working electrode 1 is essentially of cylindrical configuration having a central axial bore 7 which conically diverges in what is in FIG. 1 the downward direction. The upper portion of the working electrode 1 is surrounded by the sleeve 2 and provided with three radially directed passages 8, 9 and 11. Of these the passage 8 serves as a channel for the supply of liquid electrolyte, whereas the passages 9 and 11 respectively accommodate the inserts 3 and 4.

FIG. 1 shows that in this embodiment the insert 3 is configurated as a member of solid cross-section, that is it does not have a bore or other passage in its interior; it is of cylindrical configuration and has an end portion 10 which, in keeping with the cross-sectional configuration of the recess 54, is also of quadratic or rectangular cross-section. By contrast, the insert 4 is a hollow tubular member. Both the inserts 3 and 4, of which of course one or more each could be provided (it is not necessary to limit the passages and associated inserts to two) could be of the type shown at 3, both could be of the type shown at 4, or some could be of the type shown at 3 and others of the type shown at 4. All inserts are, however, expandable so that when they eventually wear they can be replaced with new ones. To make this possible without any difficulty they are retained only by the set screws 12 and 13, respectively, which need merely be loosened to make it possible to withdraw the inserts 3 and 4 from their associated passages 9 and 11, respectively. Also the inserts can thus be adavnced from a position in which they are fully retraced within the respective passage to a plurality of working positions in which they extend to a greater or lesser extent into the respective aperture 19 and 21 provided for this purpose in the circumferential wall of the sleeve 2. These apertures are so positioned that when the workpiece 51 surrounds the sleeve 2 they will be located in registry with the respective recesses 54 and 56 in the workpiece.

Various different materials are suitable for making the inserts 3 and 4 and the particular type of material can be readily determined by those skilled in the art, with a minimum amount of experimentation and in dependence upon the number of workpieces which are to be treated with a single insert before the insert has been worn to the point where it can no longer be used. Such materials include brass, tool steel or titanium and alloys of the latter.

There is further provided an electrode holder 14 which engages a portion (the lower portion in FIG. 1) of the working electrode 1 and holds the same; the holder 14 in turn is secured in suitable manner for instance on a worktable or the like which is not shown.

The outer peripheral surface of that portion of the working electrode 1 which is surrounded by the sleeve 2 is also provided with a groove or recess 15 which in the illustrated embodiment is of rectangular cross-section as shown. The groove 14 serves to receive liquid electrolyte, as will be discussed later.

The sleeve itself is of course also subject to wear over a period of time and for this reason it is advantageous to make the sleeve as another expandable component of the novel arrangement. The sleeve must of course be made of electrically insulating material and it is advantageous to make it of a glass fiber reinforced synthetic plastic, for which purpose polypropylene reinforced with glass fibers has been found to be highly suitable. An inwardly directed flange 17 at one end of the sleeve 2 overlies an axial end face of the working electrode 1; at the opposite end the sleeve 2 is provided with a stepped circumferentially extending recess 18 which interengages with a matingly configurated portion of the working electrode 1 to assure that the sleeve is properly supported against deformation in operation and also will properly and permanently be in engagement with the outer surface of the working electrode.

The contour and configurations of the apertures 19 and 21 in the sleeve 2 must of course correspond at least substantially to those of the recesses (here the recesses 54 and 56) with which they are to be placed into registry and cooperate. Thus, the aperture 19 in the illustrated embodiment is rectangular in keeping with the contour of the recess 54, whereas in keeping with the circular contour of the recess 56 the aperture 21 is also circular. The dimensions of the apertures 19 and 21 are advantageously slightly larger than those of the associated recesses, approximately by $\frac{1}{10}$ of a millimeter. The exterior of the sleeve 2 is provided in the region of the apertures 19 and 21 with projections 22 and 23 which merge in a circumferentially extending bead or shoulder 24, and these projections 22, 23 and bead or shoulder 24 tightly engage the surface 52 of the workpiece, circumferentially of the recesses 54 and 56 and of the one open end of the bore in the workpiece 51. The bead 24 also serves to engage and center the workpiece and prevent it from displacement and of course the projections 22 and 23 prevent contact of the electrolyte with surface portions of the workpiece which are not to be treated.

When the novel arrangement of FIGS. 1 and 2 is to be used, the sleeve 2 is first placed over the working electrode 1 to assume a position shown in FIG. 1. Thereupon the inserts 3 and 4 are pushed through the apertures 19 and 21 into the respective passages 9 and 11, thus that their outer ends are recessed by some tenth of a millimeter from the outer circumferential surface of the sleeve 2. The purpose of this is to assure that the necessary working gap is provided and reference to FIG. 1 will indicate that the head portion 10 of the insert 3 will define in the aperture 12 two gaps 25 and 26 (see also FIG. 2) for the electrolyte. The portion 10 also in effect subdivides the groove 15 into a lower and an upper chamber 28 and 27, respectively.

When the inserts 3 and 4 are in their requisite positions, they are arrested in these positions by tightening the set screws 12 and 13. Thereafter the guide member 5, which should be of a wear-resistant material, such as steel or the like, is placed onto the flange 17 of sleeve 2 and an annular washer 29 is accommodated between the electrode 1 and the guide 5 for better support. The screw 6 is then used to connect the thus assembled elements with the electrode holder 14, thus also preventing the elements from performing movements relative to one another.

Now the workpiece 51 to be treated is placed into the position shown in FIG. 1, being guided during such movement by the guide 5, and is connected as an anode to the positive pole or terminal of a source 33 of direct current. The negative pole or terminal of the source 33 is connected with the working electrode 1 so that the same constitutes the cathode.

A supply means SM for supplying and circulating liquid electrolyte is diagrammatically shown in FIG. 1. It is not believed necessary to discuss this in detail, because such supply means are well known, but it will be evident that such supply means should incorporate a reservoir for electrolyte and a suitable circulator such as a pump, for circulating the electrolyte in the requisite path from and back to the receptacle. The supply means SM is connected via suitable diagrammatically illustrated conduit means with the conduit constituted by the enlarged lower portion of the bore 7 in the working electrode, and close in the direction of the arrows shown in FIG. 1. The additional arrows indicate the further flow of the liquid electrolyte, and in particular it will be seen that the right-hand side of FIG. 1 the electrolyte will flow through the passage 8 into the lower chamber 27 of groove 15 and from there through the gap 25 past the lower portion of the edge 55 which is to be rounded or chamfered; from there the electrolyte continues to flow past the upper portion of the same edge 55, into the gap 26 and from there into the upper chamber of groove 15, from where it moves via an opening 31 in the flange 17 into a recess 32 provided for this purpose in the guide 5, with the recess 32 communicating with the diagrammatically illustrated conduit means C which returns the electrolyte to the reservoir associated with the supply means SM. At the left-hand side of the arrangement in FIG. 1, the electrolyte again enters as previously mentioned into the bore 7, to flow there through the hollow interior of the tubular insert 4 past the edge 57 which is to be rounded or chamfered and from there via the recess 56 into the diagrammatically illustrated conduit which returns it to the reservoir.

Electrolytes which are suitable for the purpose are well known including NaCl and $NaNO_3$ and need not be discussed in detail, and of course the material removing action has already been discussed.

With the construction according to the present invention as disclosed in the exemplary embodiment herein, the advantages outlined earlier are fully achieved. In particular it is now possible to provide for a very precisely limited removal of material from specific and clearly limited surface portions or edges without having to fear that adjacent surface portions will be damaged by undesired material removal or will undergo decoloration. This is of particular importance when the electro-chemical treatment is for purposes of finishing, that is when rough material removal has already taken place and fine precise treatment is now to be provided.

In addition, the construction of the inserts 3 and 4 and of the sleeve 2 as expendable components which can be readily replaced and are relatively inexpensive in their construction, is advantageous in that it further increases the possibilities of economic employment of the novel arrangement. Not only does it result in an increase in the overall lifetime of the arrangement, with only the components 2, 3 and 4 having to be replaced if and when necessary, but when such replacement has to be carried out it can be done rapidly and at low cost because the components 2, 3 and 4 are inexpensive.

A further advantage of the novel construction is that the sleeve 2 itself serves to engage and center the workpiece and that the inserts 3 and 4 can be shifted radially to various different operating positions, so that the most advantageous and effective working gap can be selected merely by shifting the inserts 3 and 4 in their respectively associated passages 9 and 11 until the most advantageous working gap configuration is achieved, a matter of very simple experimentation by those skilled in the art.

It will be understood that each of the elements described above, or two or more together, may also find a useful application in other types of constructions, differing from the types described above.

While the invention has been described and illustrated as embodied in an arrangement for electrochemical treatment of an electrically conductive workpiece, it is not intended to be limited to the details shown since various modifications and structural changes may be made without departing in any way from the spirit of the present invention.

Without further analysis, the foregoing will so fully reveal the gist of the present invention that others can, by applying current knowledge readily adapt it for various applications without omitting features that from the standpoint of prior art fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. An arrangement for electrochemical treatment of an electrically conductive workpiece provided with an opening having at least one open end and an inner circumferential boundary surface of which has at least one recess formed therein, said arrangement comprising electrically insulating sleeve means having outer dimensions so selected as to be accommodatable in said opening in tight engagement with said boundary surface at least in the region of said open end and said recess circumferentially thereof; aperture means in said sleeve means adapted to be placed into registry with said recess; electrically conductive working electrode means at least in part accommodated in said sleeve means; a DC source having a negative pole connected with said working electrode means, and a positive pole adapted to be connected with said workpiece; passage means provided in said working electrode means in longitudinal registry with said aperture means; supply means for circulating a flow of liquid electrolyte in a path which includes said aperture means; and an electrically conductive solid cross-section insert means received and slidable in said passage means between a retracted position and a plurality of advanced positions in each of which it extends to different depths into said aperture means and subdivides said supply means into an inlet and an outlet section communicating respectively with an inlet and an outlet channel defined in said aperture means by said insert means.

2. An arrangement as defined in claim 1 and further comprising arresting means for arresting said insert means in a desired one of said positions thereof.

3. An arrangement as defined in claim 1, said workpiece having at least one additional recess formed in said boundary surface; and wherein said aperture means comprises at least two apertures each adapted to be placed into registry with one of said recesses, said passage means comprises at least two passages each in longitudinal registry with one of said apertures, and said insert means comprises at least two inserts each received and slidable in one of said passages between said retracted and said plurality of advanced positions; and wherein said path includes both of said apertures.

4. An arrangement as defined in claim 1, said insulating sleeve means including retaining means for engaging and retaining the workpiece.

5. An arrangement as defined in claim 1, said insulating sleeve means being replaceably connected with said working electrode means.

6. An arrangement as defined in claim 1, said recess having adjacent said boundary surface a given cross-sectional contour; and wherein the outline of said aperture means corresponds at least substantially to said contour.

7. An arrangement as defined in claim 1, said sleeve means being of synthetic plastic material.

8. An arrangement as defined in claim 1; and further comprising guide means provided at one end of said sleeve means for affording guidance during relative movement of said sleeve means and the workpiece.

References Cited
UNITED STATES PATENTS

| | | | |
|---|---|---|---|
| 3,410,781 | 11/1968 | Carlson et al. | 204—224 M |
| 2,764,540 | 9/1956 | Farin et al. | 204—224 M X |
| 3,202,598 | 8/1965 | Covington et al. | 204—224 M |
| 3,551,310 | 12/1970 | Inoue | 204—224 M X |

JOHN H. MACK, Primary Examiner

D. R. VALENTINE, Assistant Examiner

U.S. Cl. X.R.

204—225, 288